US012262188B2

(12) United States Patent
Zhang

(10) Patent No.: US 12,262,188 B2
(45) Date of Patent: Mar. 25, 2025

(54) BONE CONDUCTION LOUDSPEAKER

(71) Applicant: Million Fame Technology Limited, Guangdong (CN)

(72) Inventor: Zhiyu Zhang, Frisco, TX (US)

(73) Assignee: Million Fame Technology Limited (CN)

( * ) Notice: Subject to any disclaimer, the term of this patent is extended or adjusted under 35 U.S.C. 154(b) by 176 days.

(21) Appl. No.: 17/945,804

(22) Filed: Sep. 15, 2022

(65) Prior Publication Data

US 2024/0098422 A1 Mar. 21, 2024

(51) Int. Cl.
*H04R 9/06* (2006.01)
*H04R 1/02* (2006.01)

(52) U.S. Cl.
CPC ................. *H04R 9/06* (2013.01); *H04R 1/02* (2013.01)

(58) Field of Classification Search
CPC ........ H04R 9/06; H04R 1/02; H04R 2460/13; H04R 7/04; H04R 1/2811; H04R 1/021; H04R 9/025
See application file for complete search history.

(56) References Cited

U.S. PATENT DOCUMENTS

| | | | | |
|---|---|---|---|---|
| 2021/0120327 | A1* | 4/2021 | Li | H04R 1/1041 |
| 2021/0219043 | A1* | 7/2021 | Li | H04R 1/1066 |
| 2021/0219059 | A1* | 7/2021 | Qi | H04R 1/00 |
| 2021/0250695 | A1* | 8/2021 | Qi | H04R 1/10 |
| 2021/0250698 | A1* | 8/2021 | Qi | H04R 11/02 |
| 2021/0250700 | A1* | 8/2021 | Qi | H04R 9/063 |
| 2021/0250701 | A1* | 8/2021 | Qi | H04R 9/066 |
| 2021/0258696 | A1* | 8/2021 | Qi | H04R 31/00 |
| 2021/0281954 | A1* | 9/2021 | Qi | H04R 9/02 |

* cited by examiner

*Primary Examiner* — Akelaw Teshale
(74) *Attorney, Agent, or Firm* — Timothy Wang; Ni, Wang & Massand, PLLC

(57) ABSTRACT

A bone conduction loudspeaker is disclosed. The loudspeaker includes a conductive case, a sound control plate arranged at one end of the conductive case and contacting with the conductive case, and an accommodating space surrounded by the conductive case and the sound control plate. The accommodating space accommodates a coil for generating a magnetic field and a magnetic assembly. The magnetic assembly, the conductive case and the sound control plate form a magnetic circuit, and the conductive case and the sound control plate are respectively made of electroacoustic materials with different thicknesses. The magnetic assembly, the conductive case and the sound control plate form a magnetic loop to form a magnetic system, and after the coil is electrified, an alternating magnetic field is generated, the alternating magnetic field intensity of the magnetic system is changed.

10 Claims, 4 Drawing Sheets

BONE CONDUCTION LOUDSPEAKER

TECHNICAL FIELD

The present disclosure relates to the technical field of acoustic conversion, and more specifically, to a bone conduction loudspeaker.

BACKGROUND

Bone conduction is a mode of sound conduction, that is, sound is converted into mechanical vibrations with different frequencies, and sound waves are transmitted through the human skull, bone labyrinth, inner ear lymph, spiral organ, auditory nerve and auditory center. In comparison with the traditional mode of sound conduction in which sound waves are generated through the diaphragm, bone conduction saves many steps of sound wave transmission, enables clear sound reduction in noisy environments, and the sound waves don't affect people surrounding by spreading through the air.

Bone conduction loudspeaker is a new type of electroacoustic conversion device developed based on the sound conduction mode of bone conduction, which can convert electric signal into mechanical vibration signal. The vibration signal is then transmitted into the cochlea through human body tissue and bone, so that the user can hear the sound. The sound is clear due to bone conduction, not having been affected by the external environments, and at the same time, does no harm to the eardrum. Therefore, bone conduction loudspeaker has been widely used in the field of earphones and the like. However, the existing bone conduction vibration speakers generally transmit low-frequency sound, and the transmission sound frequency is single, which cannot meet the user's demand of band sound with different frequencies.

SUMMARY

The technical problem to be solved by the present disclosure is to provide a bone conduction loudspeaker which can realize the mixed presentation of sounds with different frequency bands.

In order to solve that above technical problem, a bone conduction loudspeaker is provided, which includes a conductive case, a sound control plate provided on one end of the conductive case and contacting with the conductive case, and an accommodating space surrounded by the conductive case and the sound control plate. The accommodating space is configured to accommodate a coil for generating a magnetic field and a magnetic assembly. The magnetic assembly, the conductive case and the sound control plate form a magnetic circuit. The conductive case and the sound control plate are respectively made of electroacoustic materials with different thicknesses.

A further technical scheme is that the thickness of the conductive case is 0.15-0.5 mm.

A further technical scheme is that the thickness of the sound control plate is 0.8-1.4 mm.

In a further technical scheme, the magnetic assembly include a first magnet and a second magnet arranged at two side of the coil respectively.

In a further technical scheme, the bone conductive loudspeaker further includes a conductive support arranged at the bottom of the conductive case. The coil is arranged on the conductive support, and the magnetic assembly is arranged on the conductive case.

A further technical scheme is that the thickness of the conductive support is 0.4-0.8 mm.

In a further technical scheme, the conductive case includes a first top plate, two first supporting plates extending downward from opposite sides of the first top plate, and two second supporting plates bent inward from bottom ends of the two first supporting plates. The first top plate is provided with a rectangular groove. The sound control plate is connected to the first top plate at a position corresponding to the rectangular groove, and the conductive support is attached to the bottom of the two second supporting plates.

In a further technical scheme, the sound control plate is in the shape of across, and includes a horizontal plate arranged above the rectangular groove and a vertical plate connected with the horizontal plate, and two ends of the vertical plate abut and are fixed on the top surface of the first top plate.

A further technical scheme is that the length and width of the transverse plate are smaller than that the rectangular groove.

In a further technical scheme, a guide post is arranged in the middle of the conductive support, and the cores are arranged on the guide post so as to be fixed on the conductive support through the guide post.

In comparison with that prior art, in the present invention, the coils for generating a magnetic field and the magnetic assembly are accommodated in the accommodation space surround by a conductive case and a sound control plate, and the magnetic assembly, the conductive case and the sound control plate form a magnetic circuit. In order to form a magnetic system, after the coils are electrified, an alternating magnetic field is generated, and the alternating magnetic field causes the intensity of the magnetic field of the magnetic system composed of the magnetic assembly, the conductive case and the sound control plate to change. The sound control plate and the conductive case are caused to vibrate, and the end face of the conductive case and the sound control plate are directly contacted with the human body to transmit sound to the human bone. In the disclosure, the sound control plate and the conductive case are respectively made of material with different thickness, in other words, the thickness of the conductive case and the sound control plate is different, and by utilizing the relationship between the vibration frequency and the sound of the object, the mix of different treble, middle and/or bass can be realized to meet users' demand for sound of different frequency band.

DETAILED DESCRIPTION OF THE EMBODIMENTS

In order to make the objects, technical solutions and advantages of the disclosure more clearly understood by those skilled in the art, the disclosure will be further described with reference to the drawings and embodiments.

Figure 1:
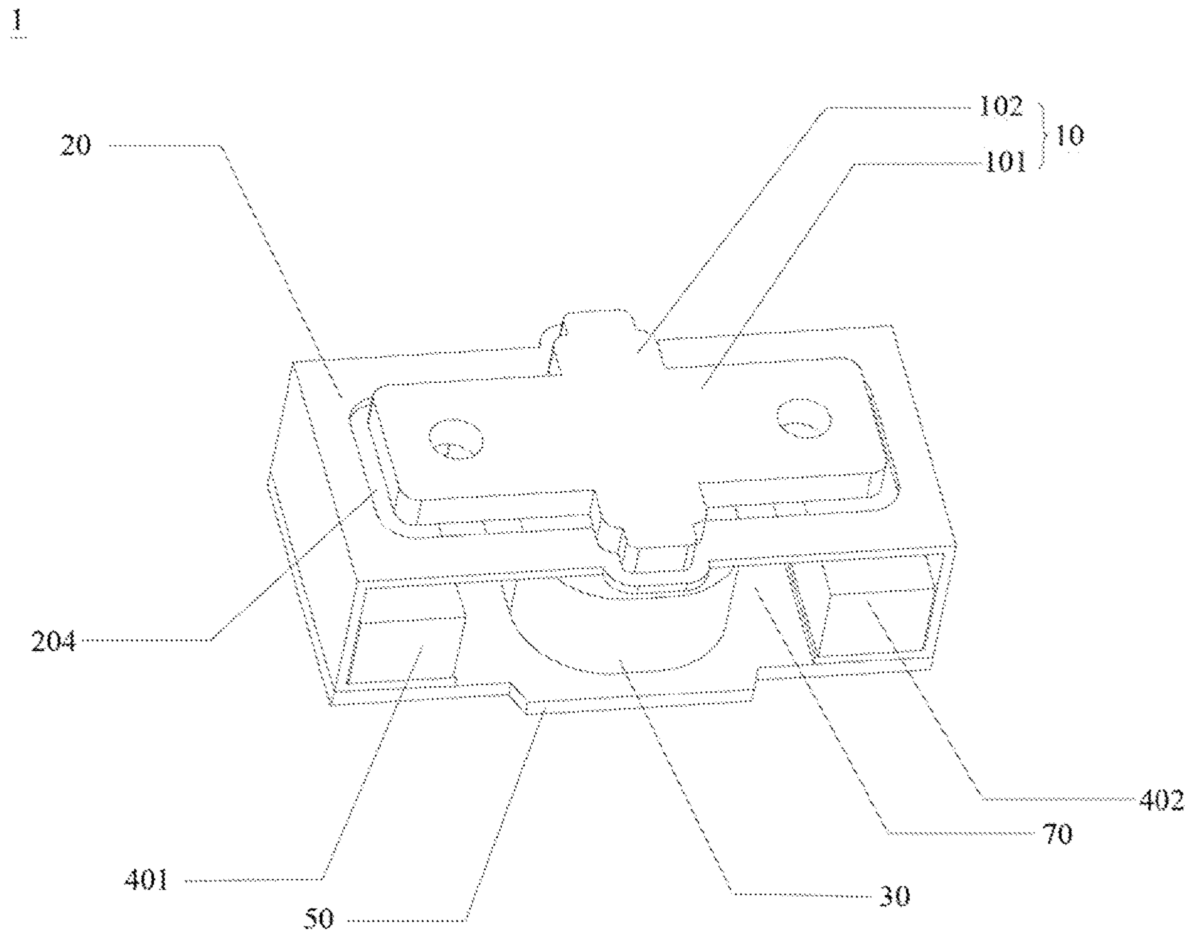
FIG. 1 is a three-dimensional structural diagram of a bone conduction loudspeaker according to an embodiment of the disclosure.
Figure 2:
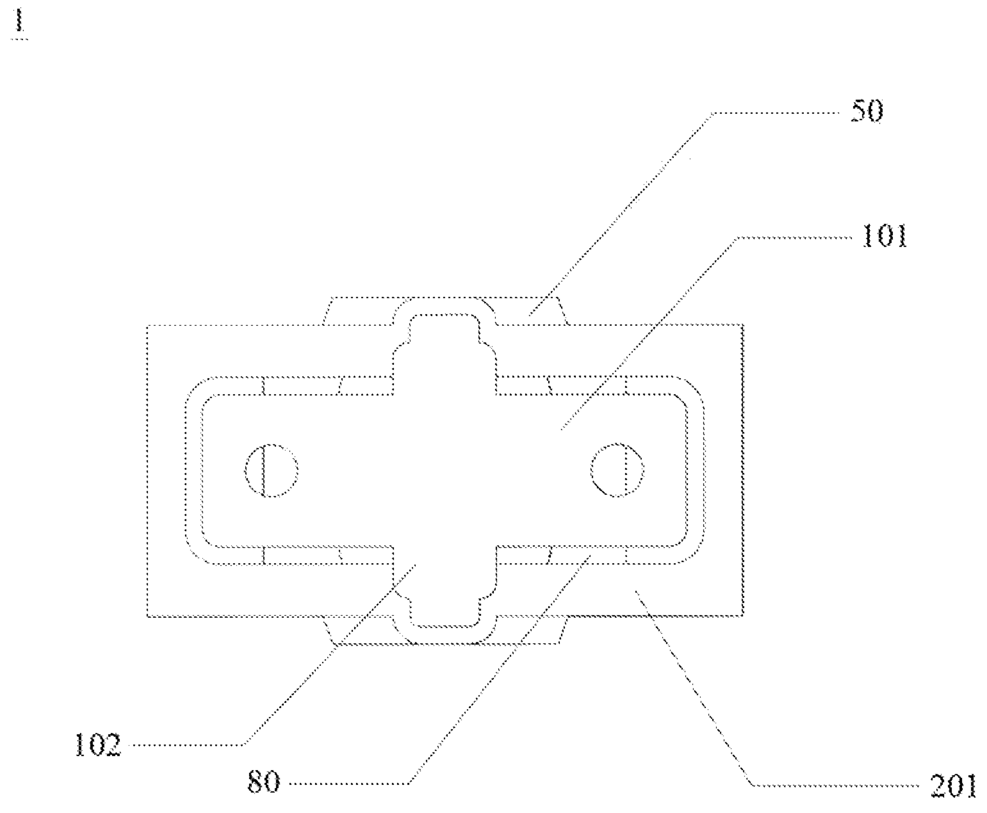
FIG. 2 is a schematic top view of the bone conduction loudspeaker of FIG. 1.
Figure 3:
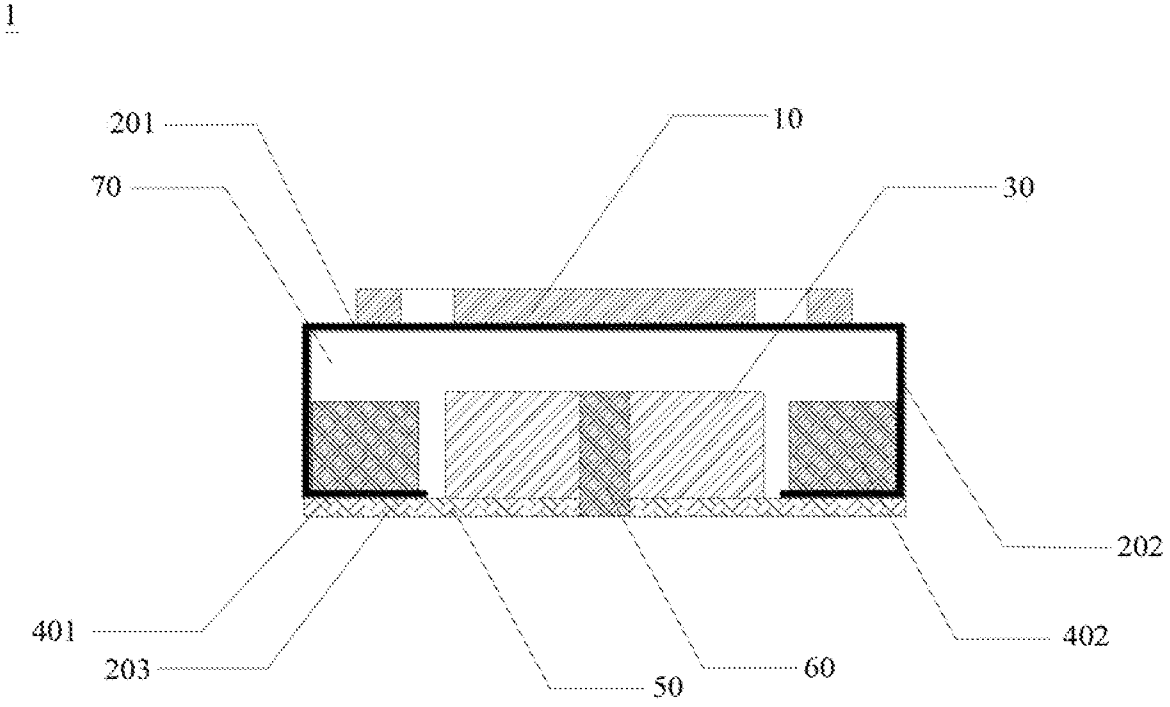
FIG. 3 is a schematic cross-sectional view of the bone conduction loudspeaker of FIG. 1.

Referring to FIG. 1 to FIG. 3, a specific embodiment of the bone conduction loudspeaker 1 of the disclosure is shown. In the embodiment shown in the drawings, the bone conduction loudspeaker 1 includes a conductive case 20, a sound control plate 10 provided at one end of the conductive case 20 and contacting with the conductive case 20, and an accommodating space 70 surrounded by the conductive case 20 and the sound control plate 10. The accommodating space 70 accommodates the coil 30 for generating a magnetic field and a magnetic assembly that forms a magnetic circuit with the conductive case 20 and the sound control plate 10. The conductive case 20 and the sound control plate 10 are made of electroacoustic materials with different thicknesses, and the electroacoustic materials include silicon steel sheet, ferrite, iron or the like. In the disclosure, the magnetic assembly, the conductive case 20 and the sound control plate 10 form a magnetic circuit, thereby forming a magnetic system. The coil 30 is electrified to generate an alternating magnetic field. The alternating magnetic field changes the magnetic field intensity of the magnetic assembly, the conductive case 20 and the sound control plate 10, and the magnetic field force applied to the conductive case 20 and the sound control plate 10 changes. The change of the force causes the sound control plate 10 and the conductive case 20 to vibrate, and the electro-acoustic materials of different thicknesses of the sound control plate 10 and the conductive case 20 utilize the relationship between the vibration frequency and sound of the object. In the embodiment, the sound control plate 10 and the conductive case 20 vibrate with different amplitude when the sound control plate 10 and the conductive case 20 respectively vibrate at high, medium and low frequencies, thereby enabling the bone conduction loudspeaker 1 to achieve a mix of various sound qualities such as different treble, mid-range and/or bass sounds and to be presented to the user.

Preferably, in the disclosure, the thickness of the conductive case 20 is 0.15-0.5 mm, and the thickness of the sound control plate 10 is 0.8-1.4 mm. In the embodiment, the two electro-acoustic materials of different thickness can be connected together by laser welding. The magnetic field causes different vibration frequency bands to the materials of different thickness, thereby satisfying the user's demand for sound of different frequency bands.

In some embodiments, the bone conductive loudspeaker 1 further includes a conductive support 50 at the bottom of the conductive case 20. The coil 30 is positioned on the conductive support 50, and the magnetic assembly is positioned on the conductive case 20. The thickness of the conductive support 50 is 0.4-0.8 mm. Further, in this embodiment, a guide post 60 is provided in the middle of the conductive support 50, and the coil 30 is sleeved on the guide post 60 to be fixed on the conductive support 50 through the guide post 60. In the disclosure, there is a gap between the guide post 60 and the side wall of the conductive case 20, and the guide post 60 is used for magnetic conduction to form a magnetic field perpendicular to the bottom of the conductive case 50.

In the embodiment shown in the drawings, the magnetic assembly includes a first magnet 401 and a second magnet 402 arranged on two sides of the coil 30 respectively. In the disclosure, dual-magnet drive is used to convert the electric sound into mechanical vibration, resulting a high conversion efficiency. Specifically, in this embodiment, the first magnet 401 and the second magnet 402 are symmetrically arranged on the conductive support 50 with the guide post 60 as the center, so as to form a uniform magnetic field with high sensitivity, thereby reducing the self-consumption of audio transmission. The electromagnetic coupling between the two magnets and the coil can be ensured, thereby improving the sound quality of the bone conduction loudspeaker 1. The first magnet 401 and the second magnet 402 may be magnets made of an alloy permanent magnet material including, but not limited to, neodymium iron boron, samarium cobalt, alnico cobalt, iron chromium cobalt, aluminum iron boron, and iron carbon aluminum ferrite permanent magnetic materials including, but not limited to, barium ferrite, steel ferrite, manganese ferrite, lithium manganese ferrite. It can be understood that, in the disclosure, the magnetic assembly is not limited to including two magnets but may be an even number of magnets such as 4, 6, or 8, as long as a uniform magnetic field is formed.

In the embodiment, the conductive case 20 includes a first top plate 201, two first supporting plates 202 extending downward from opposite sides of the first top plate 201, and two second supporting plates 203 respectively bent inward from bottom ends of the first supporting plates 202. The first magnet 401 and the second magnet 402 are respectively arranged on the two second supporting plates 203. The first top plate 201 is provided with a rectangular groove 204, and the sound control plate 10 is connected to the first top plate 201 at a position corresponding to the rectangular groove 204. The conductive support 50 is attached to the bottom of the two second supporting plates 203.

In some embodiment, the sound control plate 10 is cross shaped, and includes a cross plate 101 arranged above the rectangular groove 204 and a vertical plate 102 connected with the cross plate 101. Two ends of the vertical plate 102 are abutted and fixed to the top surface of the first top plate 201, and two ends of the vertical plate 102 are laser welded to the top surface of the first top plate 201 to overlap with the first top plate 201. The magnetic field passes through the overlap of two materials of different thickness to obtain the mid-range sound. Preferably, the size of the sound control plate 10 is smaller than that of the rectangular groove 204, that is, the length and width of the horizontal plate 101 are smaller than that of the rectangular groove 204. The sound dividing groove 80 is formed between the bottom periphery of the transverse plate 101 and the wall of the rectangular groove 204, that is, there is a gap between the bottom periphery of the transverse plate 101 and the rectangular groove 204, so that the conductive case 20 and the sound control plate 10 are not sealed, and mixing is avoided and the sound output effects are improved.

Figure 4:
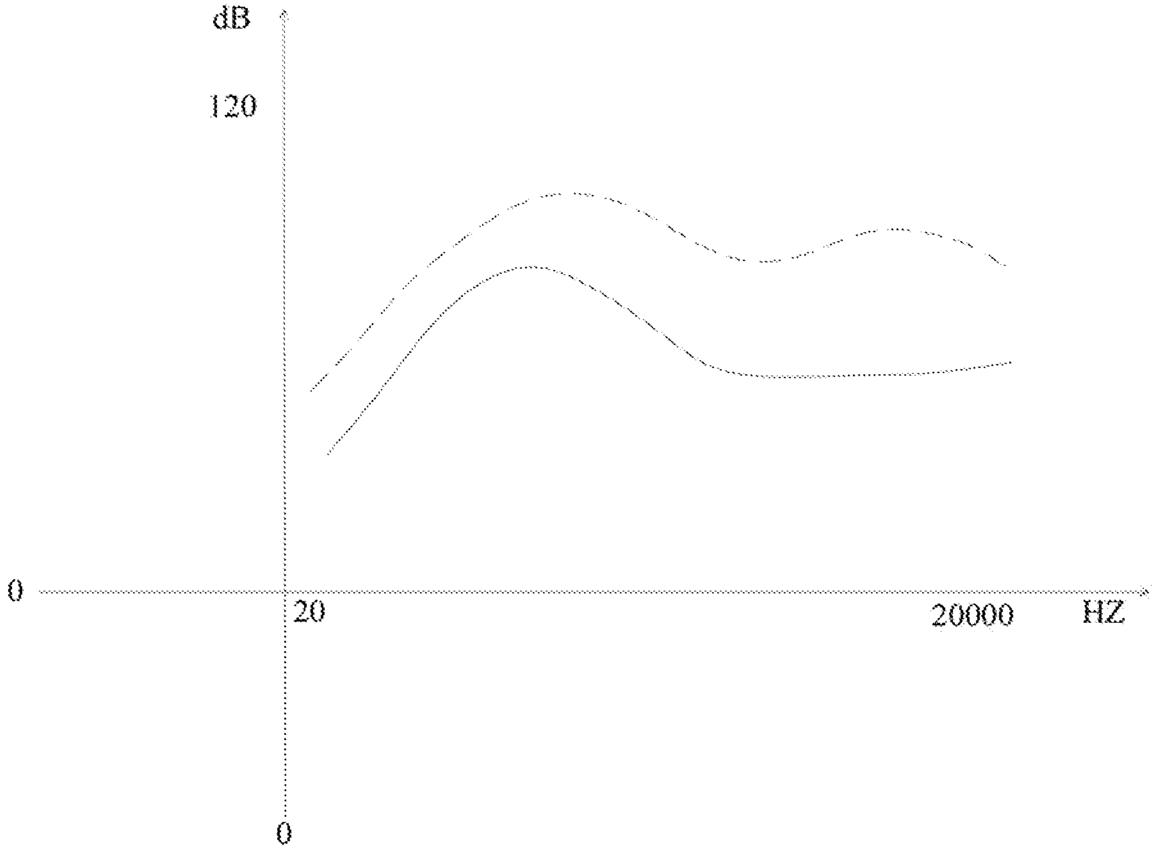
FIG. 4 is a schematic diagram of the frequency response curve of the bone conduction loudspeaker of the disclosure.

FIG. 4 is a schematic diagram of a frequency response curve of the bone conduction loudspeaker according to the disclosure, where the solid line is a frequency response curve of the bone conduction loudspeaker according to the prior art, and the dotted line is a frequency response curve of the bone conduction loudspeaker according to the disclosure. As can be seen from the figures, the frequency response actually generated by the bone conduction loudspeaker in the prior art is steep, and the sound quality is poor. In the bone conduction loudspeaker of the disclosure, the frequency response of the audio signals mix with high, medium and low audio frequency generated by the vibration is flatter, the sound is wider, the resonance response range is widened, the sound quality is better. When the frequency is the same, the sound pressure level value (sound size) of the bone conduction loudspeaker of the disclosure is larger than that of the bone conduction loudspeaker of the prior art, so the sensitivity of the bone conduction loudspeaker of the disclosure is higher.

In summary, in the disclosure, the coil for generating a magnetic field and the magnetic assembly is accommodated in the accommodating space surround by a conducting case and a sound control plate. The magnetic assembly, the conducting case and the sound control plate form a magnetic circuit. In order to form a magnetic system, that first magnet and the second magnet in the magnetic assembly form a uniform magnetic field. An alternating magnetic field is generated after the coil is electrified, and the conductive case and the sound control plate are subjected to the common action of the two magnetic fields. The alternating magnetic field changes the intensity of the magnetic field of the magnetic system consisting of the magnetic assembly, the conductive case and the sound control plate, thereby causing the conductive case and the sound control plate to vibrate. The sound control plate and the first top plate of the transmission case are in direct contact with the human body, and the vibration is transmitted to the ear through the bones of the wearer, thereby allowing the human to sense sound. In the disclosure, the conductive case and the sound control plate are respectively made of material with different thickness, that is, the thickness of the conductive shell and the sound control plate are different. The mixing of different treble, mid-range and/or bass sounds can be realized, and the users' demand for sounds of different frequency bands can be satisfied.

The foregoing is merely a preferred embodiment of the disclosure and is not intended to be constructed as limiting of the disclosure. Those skilled in the art can make various equivalent changes or modifications on the basis of the above embodiments, and any equivalent changes or modifications made within the scope of the claims should fall within the scope of protection of the disclosure.

What is claimed is:

1. A bone conduction loudspeaker, comprising a conductive case, a sound control plate provided at one end of the conductive case and contacting with the conductive case, and an accommodating space surround by the conductive case and the sound control plate; wherein the accommodating space is configured to accommodate a coil for generating a magnetic field; a magnetic circuit is formed by a magnetic assembly, the conductive case and the sound control plate; and the conductive case and the sound control plate are respectively made of electroacoustic materials with different thicknesses.

2. The bone conduction loudspeaker of claim 1, wherein the thickness of the conductive case is 0.15-0.5 mm.

3. The bone conduction loudspeaker of claim 1, wherein the thickness of the sound control plate is 0.8-1.4 mm.

4. The bone conduction loudspeaker of claim 1, wherein the magnetic assembly comprises a first magnet and a second magnet arranged on two sides of the coil respectively.

5. The bone conduction loudspeaker of claim 1, wherein the bone conduction loudspeaker further comprises a conduction support located at a bottom of the conductive case; the coil is provided on the conduction support; and the magnetic assembly is provided on the conductive case.

6. The bone conduction loudspeaker of claim 5, wherein a thickness of the conduction support is 0.4-0.8 mm.

7. The bone conduction loudspeaker of claim 5, wherein the conductive case comprises a first top plate, two first supporting plates extending downward from opposite sides of the first top plate, and two second supporting plates respectively bent inward from bottom ends of the two first supporting plates; the first top plate is provided with a rectangular groove; the sound control plate is connected to the first top plate at a position corresponding to the rectangular groove; and the conductive support is attached to the bottom of the two second supporting plates.

8. The bone conduction loudspeaker of claim 7, wherein the sound control plate is cross shaped and comprises a transverse plate provided above the rectangular groove and a vertical plate connected with the transverse plate; two ends of the vertical plate are abutted and fixed to the top surface of the first top plate.

9. The bone conduction loudspeaker of claim 8, wherein a length and width of the transverse plate are smaller than that of the rectangular groove.

10. The bone conduction loudspeaker of claim 5, wherein the middle of the conduction support is provided with a guide post, and the coil is provided on the guide post to be fixed on the conduction support through the guide post.

* * * * *